US 9,986,089 B2

(12) United States Patent
Gilbert

(10) Patent No.: US 9,986,089 B2
(45) Date of Patent: May 29, 2018

(54) OPTIMIZING CHANNEL SELECTION FOR CUSTOMER CARE

(71) Applicant: AT&T INTELLECTUAL PROPERTY I, L.P., Atlanta, GA (US)

(72) Inventor: Mazin E. Gilbert, Warren, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days. days.

(21) Appl. No.: 14/835,246

(22) Filed: Aug. 25, 2015

(65) Prior Publication Data

US 2017/0064083 A1   Mar. 2, 2017

(51) Int. Cl.
*H04M 3/00* (2006.01)
*H04M 3/51* (2006.01)

(52) U.S. Cl.
CPC ....... *H04M 3/5166* (2013.01); *H04M 3/5141* (2013.01); *H04M 2203/408* (2013.01); *H04M 2203/551* (2013.01)

(58) Field of Classification Search
CPC .................................................. H04M 3/5166
USPC ....... 379/265.01-265.13, 266.01-266.1, 309
See application file for complete search history.

(56) References Cited

U.S. PATENT DOCUMENTS

| | | | |
|---|---|---|---|
| 7,136,448 B1* | 11/2006 | Venkataperumal | H04M 3/5166 379/265.02 |
| 7,251,696 B1 | 7/2007 | Horvitz | |
| 7,653,573 B2* | 1/2010 | Hayes, Jr. | G06Q 10/10 455/412.1 |
| 8,111,686 B2 | 7/2012 | Chavda et al. | |
| 8,332,249 B1 | 12/2012 | Aykin | |
| 8,488,773 B1 | 7/2013 | Boutcher et al. | |
| 8,533,857 B2* | 9/2013 | Tuchman | H04L 63/104 705/304 |
| 8,693,998 B2 | 4/2014 | Portman et al. | |
| 8,767,948 B1 | 7/2014 | Riahi et al. | |
| 8,788,582 B2* | 7/2014 | Heiss | G06Q 10/10 709/204 |
| 8,811,598 B2 | 8/2014 | Fagundes | |
| 8,831,205 B1 | 9/2014 | Wu et al. | |
| 8,867,733 B1 | 10/2014 | Conway et al. | |
| 9,047,871 B2 | 6/2015 | Dimitriadis et al. | |
| 9,069,450 B2 | 6/2015 | Samokar et al. | |
| 9,076,146 B2 | 7/2015 | Feng et al. | |
| 9,083,561 B2 | 7/2015 | Griesmer et al. | |
| 9,124,957 B1* | 9/2015 | Fogel | H04Q 3/66 |
| 9,204,452 B1* | 12/2015 | Guthrie | H04W 72/12 |
| 2003/0084448 A1* | 5/2003 | Soundararajan | H04N 21/443 725/46 |
| 2003/0200135 A1* | 10/2003 | Wright | G06Q 30/0201 705/7.29 |

(Continued)

OTHER PUBLICATIONS

Multi-Channel Contact Center by MINKARA, Nov. 2012.

*Primary Examiner* — William Deane, Jr.
(74) *Attorney, Agent, or Firm* — Greenblum & Bernstein, P.L.C.

(57) ABSTRACT

A customer contact system receives a customer inquiry from a customer. Availability of different types of resources for handling the customer inquiry is used to calculate a ranking for the different types of resources for handling the customer inquiry. A type of resource with the highest rank is offered to the customer in order to resolve the customer inquiry.

20 Claims, 6 Drawing Sheets

(56) References Cited

U.S. PATENT DOCUMENTS

| | | | |
|---|---|---|---|
| 2004/0039593 A1* | 2/2004 | Eskandari | G06Q 30/0202 705/7.31 |
| 2007/0159973 A1 | 7/2007 | Alberg et al. | |
| 2007/0185867 A1* | 8/2007 | Maga | G06Q 30/02 |
| 2008/0021998 A1* | 1/2008 | Wentink | H04M 3/5191 709/226 |
| 2008/0220786 A1* | 9/2008 | Beacham | H04W 72/085 455/450 |
| 2009/0274286 A1* | 11/2009 | O'Shaughnessy | H04M 1/72547 379/201.12 |
| 2010/0057548 A1* | 3/2010 | Edwards | G06Q 30/0211 705/14.13 |
| 2010/0183125 A1* | 7/2010 | Hayes, Jr. | G06Q 10/10 379/88.01 |
| 2010/0241634 A1* | 9/2010 | Madhok | G06Q 10/107 707/748 |
| 2010/0287131 A1 | 11/2010 | Church | |
| 2010/0324961 A1* | 12/2010 | Singh | G06Q 30/016 705/304 |
| 2011/0069821 A1* | 3/2011 | Korolev | H04M 3/5141 379/88.04 |
| 2011/0093509 A1 | 4/2011 | Fan et al. | |
| 2013/0010622 A1* | 1/2013 | Horn | H04W 72/085 370/252 |
| 2013/0054306 A1* | 2/2013 | Bhalla | G06Q 30/02 705/7.31 |
| 2014/0172992 A1* | 6/2014 | Frederick | H04W 12/06 709/206 |
| 2014/0173002 A1* | 6/2014 | Frederick | H04W 12/06 709/206 |
| 2014/0330718 A1* | 11/2014 | Felse | G06Q 20/1085 705/42 |
| 2015/0058424 A1* | 2/2015 | Tseng | G06Q 10/101 709/204 |
| 2015/0235655 A1 | 8/2015 | Dimitriadis et al. | |
| 2015/0269210 A1 | 9/2015 | Feng et al. | |
| 2015/0281447 A1 | 10/2015 | Griesmer et al. | |
| 2015/0331583 A1* | 11/2015 | Zhang | G06F 3/04842 715/825 |
| 2016/0182657 A1* | 6/2016 | Mukherjee | H04L 67/16 709/223 |
| 2016/0342911 A1* | 11/2016 | Kannan | G06Q 30/01 |

* cited by examiner

OPTIMIZING CHANNEL SELECTION FOR CUSTOMER CARE

BACKGROUND

1. Field of the Disclosure

The present disclosure relates to the field of customer care. More particularly, the present disclosure relates to optimizing channel selection for customer care.

2. Background Information

Call centers have long been used in the field of customer care. Human agents answer telephone calls at the call centers and provide information to callers. The human agents may be provided with instructions to guide the callers through the calls, in order to solicit input as to what the callers are looking for, and in order to provide answers to the callers.

Additionally, interactive voice response (IVR) systems have been used in the field of customer care as a replacement for or alternative to human agents. Interactive voice response systems provide interactive menu choices to callers in accordance with variable scripts, so that the callers navigate through a menu by providing requested information to the interactive voice response systems. As such, the interactive voice response systems mimic human agents in some ways so as to also solicit input as to what callers are looking for, and in order to provide answers to the callers.

DETAILED DESCRIPTION

In view of the foregoing, the present disclosure, through one or more of its various aspects, embodiments and/or specific features or sub-components, is thus intended to bring out one or more of the advantages as specifically noted below.

Methods described herein are illustrative examples, and as such are not intended to require or imply that any particular process of any embodiment be performed in the order presented. Words such as "thereafter," "then," "next," etc. are not intended to limit the order of the processes, and these words are instead used to guide the reader through the description of the methods. Further, any reference to claim elements in the singular, for example, using the articles "a," "an" or "the", is not to be construed as limiting the element to the singular.

Figure 1:
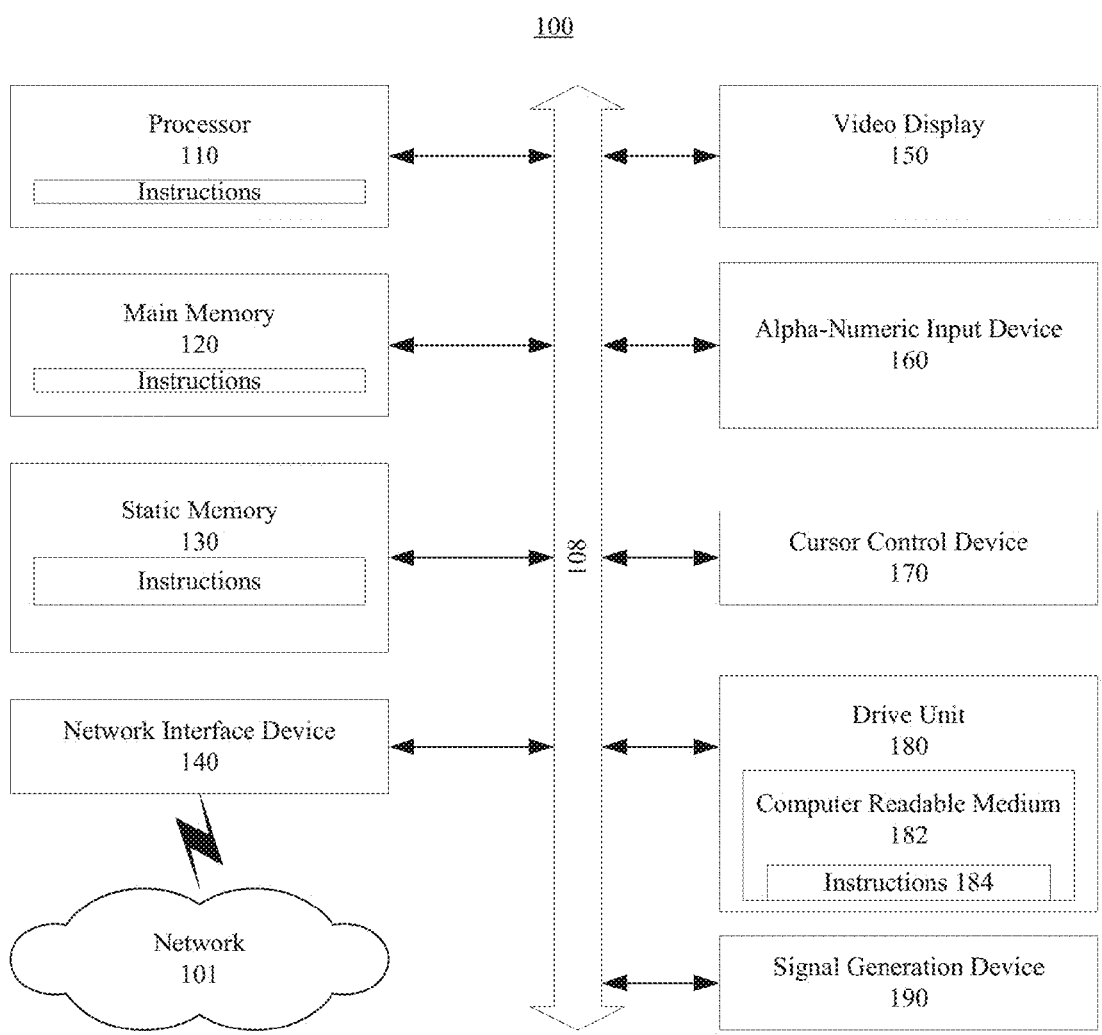
FIG. 1 shows an exemplary general computer system that includes a set of instructions for optimizing channel selection for customer care.

FIG. 1 is an illustrative embodiment of a general computer system, on which a method of optimizing channel selection for customer care can be implemented, and which is shown and is designated 100. The computer system 100 can include a set of instructions that can be executed to cause the computer system 100 to perform any one or more of the methods or computer based functions disclosed herein. The computer system 100 may operate as a standalone device or may be connected, for example, using a network 101, to other computer systems or peripheral devices.

In a networked deployment, the computer system 100 may operate in the capacity of a server or as a client user computer in a server-client user network environment, or as a peer computer system in a peer-to-peer (or distributed) network environment. The computer system 100 can also be implemented as or incorporated into various devices, such as a stationary computer, a mobile computer, a personal computer (PC), a laptop computer, a tablet computer, a wireless smart phone, a set-top box (STB), a personal digital assistant (PDA), a global positioning satellite (GPS) device, a communications device, a control system, a camera, a web appliance, a network router, switch or bridge, or any other machine capable of executing a set of instructions (sequential or otherwise) that specify actions to be taken by that machine. The computer system 100 can be incorporated as or in a particular device that in turn is in an integrated system that includes additional devices. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 includes a processor 110. A processor for a computer system 100 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. A processor is an article of manufacture and/or a machine component. A processor for a computer system 100 is configured to execute software instructions in order to perform functions as described in the various embodiments herein. A processor for a computer system 100 may be a general purpose processor or may be part of an application specific integrated circuit (ASIC). A processor for a computer system 100 may also be a microprocessor, a microcomputer, a processor chip, a controller, a microcontroller, a digital signal processor (DSP), a state machine, or a programmable logic device. A processor for a computer system 100 may also be a logical circuit, including a programmable gate array (PGA) such as a field programmable gate array (FPGA), or another type of circuit that includes discrete gate and/or transistor logic. A processor for a computer system 100 may be a central processing unit (CPU), a graphics processing unit (GPU), or both. Additionally, any processor described herein may include multiple processors, parallel processors, or both. Multiple processors may be included in, or coupled to, a single device or multiple devices.

Moreover, the computer system 100 includes a main memory 120 and a static memory 130 that can communicate with each other via a bus 108. Memories described herein are tangible storage mediums that can store data and executable instructions, and are non-transitory during the time instructions are stored therein. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. A memory described herein is an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted.

As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard/virtual keyboard or touch-sensitive input screen or speech input with speech recognition, and a cursor control device 170, such as a mouse or touch-sensitive input screen or pad. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g. software, can be embedded. Sets of instructions 184 can be read from the computer-readable medium 182. Further, the instructions 184, when executed by a processor, can be used to perform one or more of the methods and processes as described herein. In a particular embodiment, the instructions 184 may reside completely, or at least partially, within the main memory 120, the static memory 130, and/or within the processor 110 during execution by the computer system 100.

In an alternative embodiment, dedicated hardware implementations, such as application-specific integrated circuits (ASICs), programmable logic arrays and other hardware components, can be constructed to implement one or more of the methods described herein. One or more embodiments described herein may implement functions using two or more specific interconnected hardware modules or devices with related control and data signals that can be communicated between and through the modules. Accordingly, the present disclosure encompasses software, firmware, and hardware implementations. Nothing in the present application should be interpreted as being implemented or implementable solely with software and not hardware such as a tangible non-transitory processor and/or memory.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

The present disclosure contemplates a computer-readable medium 182 that includes instructions 184 or receives and executes instructions 184 responsive to a propagated signal; so that a device connected to a network 101 can communicate voice, video or data over the network 101. Further, the instructions 184 may be transmitted or received over the network 101 via the network interface device 140.

A customer contact system as described herein is a system used by an entity to provide customer care, such as information and/or services, to customers over one or more communications networks. Such customer contact systems may include call centers with human agents, computers that implement virtualized agents over data networks, interactive voice response systems that communicate over telephony networks, and so on. Such customer contact systems provide customer care on behalf of companies, governmental entities, individuals, or groups of companies, governmental entities and/or individuals.

As described herein, predictive data collected by a computerized system is used to predict the optimal channel to offer to a customer contacting such a customer contact system. The predictive data is analyzed by the computerized system in order to identify the best type of channel or channels to offer to the customer. If multiple channels are to be offered, they may be offered in the rank order from the top choice, the second top choice, the third top choice, and so on. The optimal channel may be optimal in terms of what is considered best suited to satisfy the customer's needs, or may also or alternatively be optimal in terms of what is considered best suited to satisfy the customer contact center provider's needs.

Examples of different possible offerings are, as described above, a human agent, an automated interactive voice response system, a virtual computerized agent, and other types of agents. Additionally, the channel offerings may include a telephone call, an email exchange, a text exchange, a social media message exchange, an exchange via a specific website, a short messaging service exchange, or a chat session.

Figure 2:
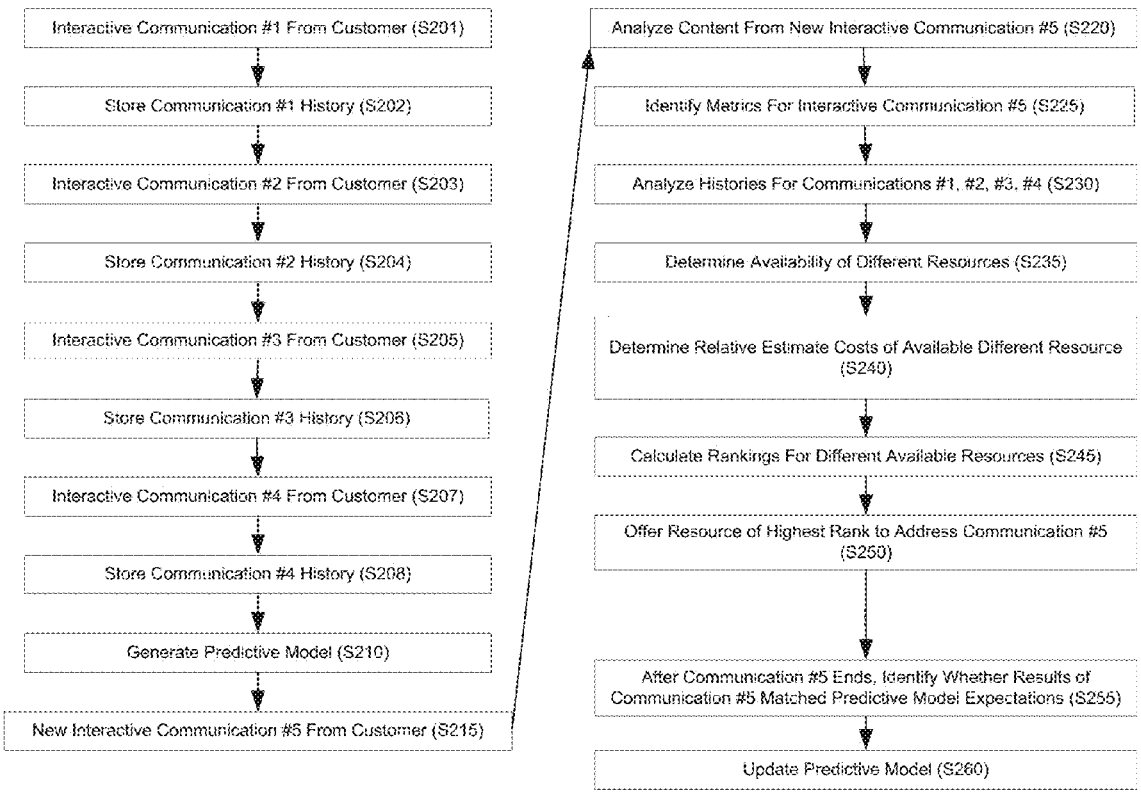
FIG. 2 shows an exemplary method for optimizing channel selection for customer care, according to an aspect of the present disclosure.

FIG. 2 shows an exemplary method for optimizing channel selection for customer care, according to an aspect of the present disclosure. In FIG. 2, an interactive communication #1 between a customer and a recipient occurs at S201. At S202 the history of communication #1 is stored. An interactive communication #2 between a customer and a recipient occurs at S203. At S204 the history of communication #2 is stored. An interactive communication #3 between a customer and a recipient occurs at S205. At S206 the history of communication #3 is stored. An interactive communication #4 between a customer and a recipient occurs at S207. At S208 the history of communication #4 is stored.

The predictive data described herein may be generated from the various interactive communications #1, #2, #3, #4. The predictive data may include the type of channel the customer uses to contact the customer contact system, the time of the contact, the day of week of the contact, the date of the contact, the reason for the contact, the customer's state of mind (e.g., angry, happy, frustrated), the customer's familiarity with the topic they are calling about, the customer's language, and so on. The predictive data may also include demographic information (e.g., age, gender, race, zip code, marital status, income etc.), the value of the customer's account to the provider of the customer contact system, special needs of the customer, and so on. A computerized predictive system can use this information from and about the customer as a first set of data to use in predicting the optimal channel to offer to the customer to resolve the customer contact.

The predictive model can also use other types of input in order to make a prediction as to the optimal channel. For instance, the predictive model may use first call resolution (FRC) and/or average handling time (AHT). First call resolution checks to see whether a similar request addressed by a channel has caused repeated transactions and follow-ups. Average hold time is the average time it took for an agent to address a transaction through a specified channel. Both first call resolution and average handling time, as well as other types of information collected or determined by a customer contact system provider, can be used as inputs to a predictive model.

At S210, a predictive model is generated. The predictive model uses the first set of data from previous communications and known information about the customer and other customers, as well as a second set of data as described herein, in order to identify the highest ranked channel or channels to offer to the customer to resolve the customer contact. The second set of data may be information provided directly by the provider of the customer contact center, such as preferences and resource availability of different types of resources at different times and dates.

Though S210 is shown in FIG. 2 as being performed after four communication histories are stored, the predictive model described herein may be generated at other times in relation to other features shown in FIG. 2. For example, a predictive model may be generated in a laboratory by computer scientists, and then adaptively updated based on actual results from actual communications. A predictive model may be generated based on communication histories. A predictive model may also be generated, as explained herein, using input from the provider of the customer care systems, such as preferences on which type of resources to offer.

At S215, a new interactive communication #5 between a customer and a recipient occurs. Content from the new interactive communication #5 is analyzed at S220. Metrics for interactive communication #5 are identified at S225. Histories for communications #1, #2, #3 and #4 are analyzed at S230. The predictive model uses all of this information from the customer and the customer contact center provider, and generates recommendations for the best (highest ranked) type of channel to offer to the customer. The customer may be provided with options to change the channel type, to select a time to again contact the customer contact center provider or to be contacted by the customer contact center, as well as with language choices, or choices to ensure appropriate types of information are made available to the customer.

Content analyzed at S220 may include the actual language and words used by the customer, selections made by the customer such as on an internet page or an interactive voice response system, and navigation choices such as how a customer navigates on a web page. The content may also include direct statements such as descriptions of why the customer is contacting the customer contact center.

Metrics identified at S225 may include time, date, channel, information about the customer and customer account, and other forms of information not directly provided by the customer as content. Metrics may also include information from previous communications from the customer and other customers, including previous communications made by the same type of channel, for the same reason(s), to the same communication address, from customers with similar demographic information (income, gender, home zip code), and so on.

The histories from previous communications analyzed at S230 may include any types of information from the previous communications, including date, time, reason, channel type, whether the reason for the contact was resolved successfully, and so on. The histories may also include other information such as information provided by the customer in the previous communications, as well as complaints, escalations and other types of information directly or indirectly provided by the customer during the previous communications.

At S235, the availability of different resources is determined. Different resources may be different agents either generally or with particular characteristics, such as skill set, language, specialty etc. Different resources may also be particular types of maintained automated resources such as interactive voice response systems or virtual agents. The availability may be queue length, such as how many communications are waiting for a particular resource at the moment, or whether the particular resource is even available for a particular shift or date or time. The availability determination may ascertain, for example, that human agents are not available on a weekend or that an interactive voice response system is unavailable due to maintenance, or that a specialized automated agent already has three customers waiting.

Determinations of availability as described herein may be dynamic, for each incoming communication. Determinations of availability as described herein may also be periodic, such as a poll every 30 seconds or every 15 minutes to determine which human agents with which skills are available, which interactive voice response systems have queues and how long each queue is, and which computer systems are down for maintenance. Availability determinations may reflect dynamic changes, such as which resources are handling current incoming communications, and predetermined changes, such as preplanned maintenance periods for systems. The different types of resources may differ based on which type of communication channels they can use (e.g., voice, text, email), which type of customers they can handle (e.g., language or technical skills), location, and so on. Thus, a determination of availability of different types of systems may list numerous types of resources and their availability, and is not simply a listing of resources of the same type such as different interactive voice response systems.

At S240, relative estimated costs of different available resources are determined. Estimated costs may be the cost per minute or cost per communication estimates for handling a communication. For example, a human agent may be generally considered the most costly option, so a customer contact center may wish to steer as many communications as possible. In contrast, an interactive voice response system may be considered to incur moderate costs of ½ the costs of a human agent or less, and an automated virtual agent contacted over the internet may be considered to incur almost no cost for the customer contact center provider.

At S245, rankings for the different available resources are calculated. The calculation at S245 may be based on cost, availability, and any or all of the information noted herein that is available to a predictive model. At S250 the resource or resources with the highest ranking are offered to the customer. After the communication ends, at S255 a determination is made as to whether the results of the communication #5 matched expectations of the predictive model. At S260, the predictive model is updated, either to reinforce the accuracy of the predictive model when the results of communication #5 are as expected or to revise the predictive model when the results of communication #5 are different than expected. That is, the predictive model ensures continual accuracy by incorporating results of communications as feedback so as to adapt to failure, and so as to reinforce existing model results that are successful.

As described herein, digital customer care includes self-service, virtual assistants, and human assistants. Channels that can be used include social networks, chat, instant messaging (IM), voice, email and internet/web. The care can be provided via web browsers, and via applications installed or even pre-installed on devices. The care can be provided to users using mobile devices such as smart phones and tablets, connected automobiles, smart home devices including computers and smart televisions, and wearable devices.

As described herein, a customer may have a channel preference that varies based on the mechanism used to initiate the contact (e.g., mobile device, automobile, home device, wearable device) and the customer's circumstances at the time they initiate contact with customer care. From the customer care provider's viewpoint, the optimal channel may vary depending on channel (e.g., social network, chat, instant messaging, voice, email, internet/web) availability, cost, likely effectiveness and probability of success.

Given the varying preferences of customers and the varying channel optimization for providers, predictive analytics are used to select the optimal channel given available information including selected observations and data. The channel optimization may include offering one or more channels to a customer in the order indicated to be optimal by the predictive analytics. Such channels that are offered may differ from the channel used by the customer to initiate the contact to the customer care.

The predictive analytics may vary the determination of optimal channel based on the purpose of the customer's contact. For example, one customer may call to inquire about a new product, and another customer may initiate a web-based chat via a web-based customer care page to check on the status of a repair. The predictive model may take into account both the channels used by the customers (here, call versus chat), as well as the purpose of the contact (here new product inquiry versus checking status for an existing repair order).

The predictive model is created and updated for the customer care provider, so as to use rules and/or take available information and data into account, and generate an optimal channel to offer to the customer for completing the customer care service. The predictive model may include:
- determining the queue length of customers for different channels, different contact centers, different agents and/or agent types
- the nature of the customer inquiry, whether stated explicitly by the customer or inferred from the contact such as by a communication address contacted by the customer
- the cost (e.g., per minute) for each different type of customer care channel
- channels used previously by the customer to contact customer care at the customer care provider
- the relative value of the customer to the provider of the customer care service The predictive model can then provide a ranked list of channels to the customer. The ranked list can be the different channels that can be used to complete the customer care service, in the optimal order identified by the predictive model. The predictive model can be configured by the customer care provider, so as to change the relative importance of inputs to the predictive model on demand. In this way, a business can (temporarily) minimize costs for customer care for a specified period of time by, e.g., driving customer care channels offerings to the least costly channels.

The predictive model can include feedback mechanisms for deep learning, including deep neural networks, so that the inputs to the predictive model are variable and the model itself is updated to reflect optimizations determined in retrospect to be wrong. As noted, the output of the predictive models can be a ranked list of channels that the customer can use to complete the requested customer care. Other stochastic and artificial intelligence models can also be used. By tracking its state and effectiveness, the predictive model can train itself to achieve the goals most important to the customer care provider, such as by reducing cost, reducing customer wait times, reducing complaints, and/or maximizing the customer care contacts that are resolved on the first attempt. The predictive model can use both failure and success to vary optimized channel offerings for different days, times of day, customer demographics, and natures of the different contacts etc.

Figure 3:
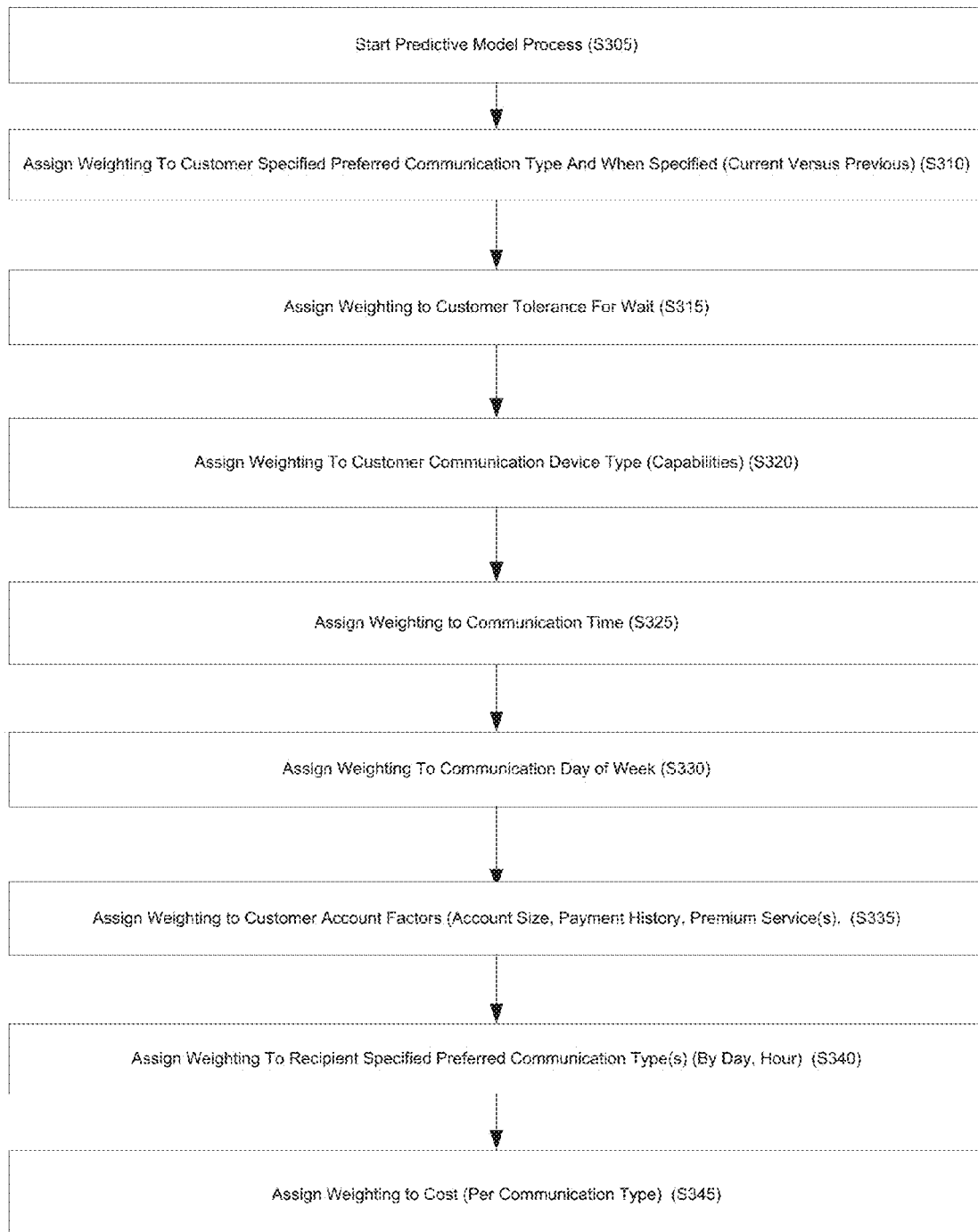
FIG. 3 shows another exemplary method for optimizing channel selection for customer care, according to an aspect of the present disclosure.

FIG. 3 shows another exemplary method for optimizing channel selection for customer care, according to an aspect of the present disclosure. In FIG. 3, a predictive model process is started at S305. A predictive model may use weighted variables in order to identify an optimal channel to offer to a customer. The weightings and variables may be set by the customer care system provider to optimize results for the customer, for the customer care system provider, or both. For example, the customer care system provider may wish to reduce costs, or use the most expensive resources only when determined necessary, whereas a customer may have different interests such that the customer might only be able to communicate using a particular channel or other resource. Thus, the predictive model can be set to achieve different results for the same or different users at different times in different circumstances. The model may take into consideration a variety of factors as described below.

At S310, weightings are assigned to customer specified preferred communication types, along with the timing of when such preferred communication types are preferred by the customer. At S315, a weighting is assigned to a customer tolerance for waiting times. At S320, a weighting is assigned to a customer communication device type. At S325, a weighting is assigned to the time of the communication. At S330 a weighting is assigned to the day of the week the communication is placed. At S335, a weighting is assigned to customer account factors such as account size, payment history, whether the customer subscribes to premium services and so on. At S340, a weighting is assigned to a preferred communication type specified by the recipient, where such preferences may vary by day, hour, day of seek and so on. At S345, weightings are assigned to the cost per communication type as indicated by the customer care provider.

An example of weightings may be assigning weights that when added are equal to 100. Another example is to assign relative values to a variety of weighted factors, regardless of what the total of the assigned values ultimately add up to. The factors assigned weightings in FIG. 3 are merely representative, and are not exhaustive insofar as many relevant factors may be taken into consideration when determining which information to take into account when identifying a best channel for a customer contact.

Figure 4:
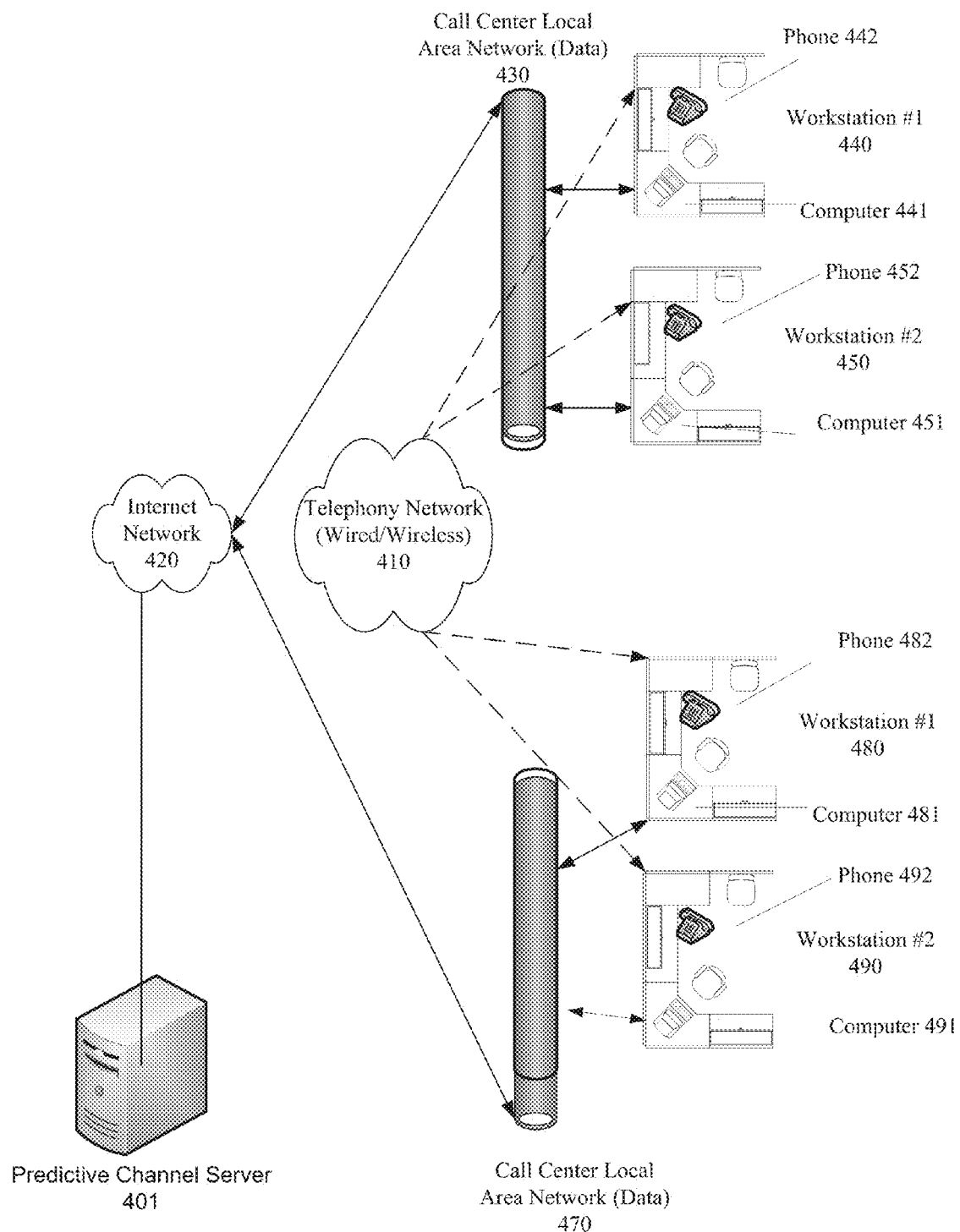
FIG. 4 shows a network overview for optimizing channel selection for customer care, according to an aspect of the present disclosure.

FIG. 4 shows a network overview for optimizing channel selection for customer care, according to an aspect of the present disclosure. In FIG. 4, customers using telephones and/or the internet use wired and/or wireless telephony networks 410 and or the internet network 420 to contact agents at call centers. The call center local area network (data) 430 is used by multiple agents at multiple workstations including workstation #1 440 and workstation #2 450. Workstation #1 440 includes a computer 441 and phone 442 for a human agent to use. Workstation #2 450 includes a computer 451 and phone 452 for a human agent to use. Another call center local area network (data) 470 is used by multiple agents at multiple workstations including workstation #1 480 and workstation #2 490. Workstation #1 480 includes a computer 481 and phone 482. Workstation #2 490 includes a computer 491 and phone 492.

In the embodiment of FIG. 4, a predictive channel server 401 is used to collect data from customer communications involving human and automated agents at multiple call centers. The predictive channel server 401 generates and updates a predictive model in accordance with a customer care provider's instructions in order to optimize which channels to offer to customers in order to complete customer care requests. The model uses the first set of data from customer communications including the incoming communication, and the second set of data from the customer care provider in order to identify the best channel to offer to the customer for use in resolving the customer's contact.

Figure 5:
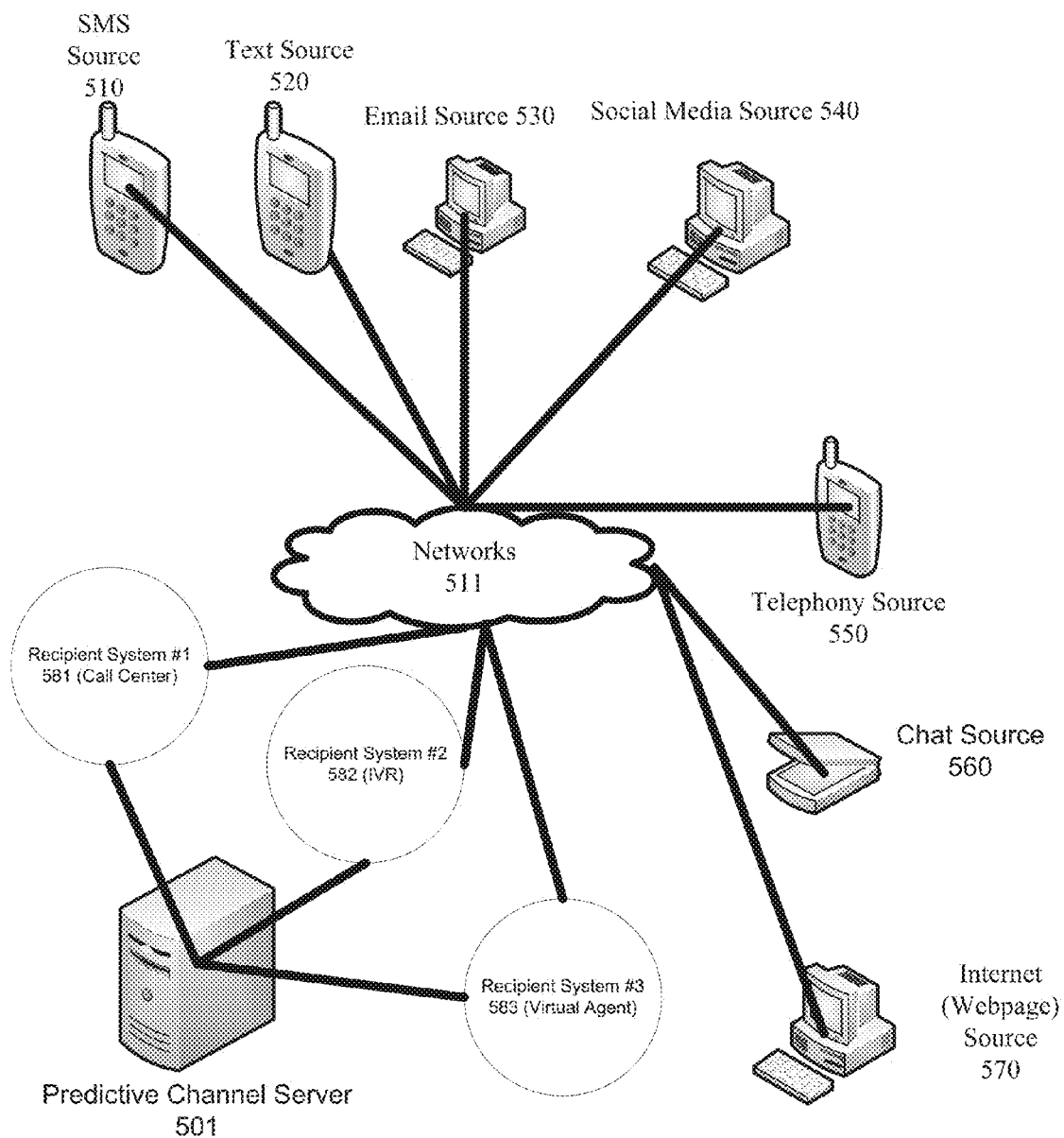
FIG. 5 shows another network overview for optimizing channel selection for customer care, according to an aspect of the present disclosure.

FIG. 5 shows another network overview for optimizing channel selection for customer care, according to an aspect of the present disclosure. In FIG. 5, customers may involve a variety of different types of communications devices with different communication capabilities. Devices include a simple messaging system (SMS) source 510, a text source 520, an email source 530, a social media source 540, a telephony source 550, a chat source 560, and an internet (webpage) source 570. The various source devices 510-570 communicate across networks 511 that may include wired and wireless telephony networks, as well as the internet. The source devices 510-570 are used to communicate with customer care providers 581, 582, and 583. Customer care provider 581 is a call center that serves as a recipient system #1. Customer care provider 582 is an interactive voice response (IVR) system that serves as recipient system #2. Customer care provider is a virtual agent computer system that serves as recipient system #3. In FIG. 5, all three customer care providers 581, 582, and 582 feed information to predictive channel server 501, and receive optimized communication channel instructions from predictive channel server 501.

As described herein, customers can use a variety of different channels, such as internet, voice, text, email, etc. to contact a customer care system. Customers can use numerous different devices too, such as smart phones, computers, traditional landline phones, tablets, etc. to contact a customer care center. The customer care center can dynamically identify which type of resource to offer to the customer using the optimization described herein, and the optimization may include consideration of which type of device a customer is using, or might have access to.

Figure 6:
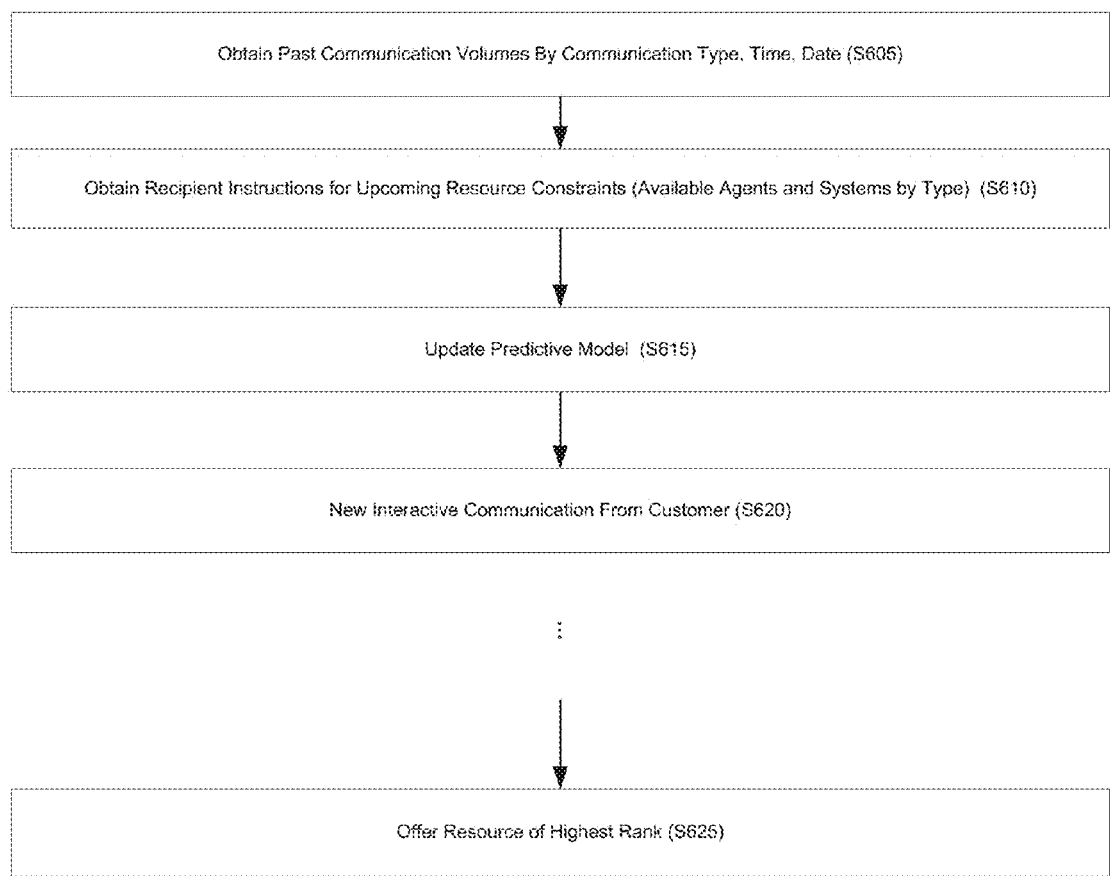
FIG. 6 shows another method for optimizing channel selection for customer care, according to an aspect of the present disclosure.

FIG. 6 shows another method for optimizing channel selection for customer care, according to an aspect of the present disclosure. In FIG. 6, past communication volumes are obtained by communication type, time and date at S605. Recipient instructions for upcoming resource constraints are obtained at S610. The recipient instructions can vary by available agents and systems by type. At S615, the predictive model is updated based on the obtained information of the past communication volumes and the recipient instructions. At S620, a new interactive communication from a customer occurs, and the customer is then offered an optimized communication channel in accordance with the updated predictive model. That is, at S625, the customer is offered the resource with the highest rank as described herein.

Accordingly, optimizing channel selection for customer care enables a customer care provider to optimize channel usage for customers in a way that allows the customer care provider to balance the provider's resources, the customer's preferences, and previous successes and failures in providing customer care by different types of resources and over different channels. The model may dynamically identify an optimal channel to offer to a customer, where different customers contacting the same customer care provider at the same time and even by the same types of channel may be offered different types of channels based on the model factors described herein.

A predictive model as described herein may use assigned weights to different variables in order to predict an optimal channel for a user. The predictive model can be applied dynamically at the time of an incoming communication, using the content and circumstances of the incoming communication as inputs to the variables of the predictive model. In this way, different users can be assigned different weightings.

Additionally, the predictive model described herein can use machine learning in order to repetitively improve the prediction process, using both successes and failures to identify improvements such as changes to weightings or even variables to use or not use. As described herein, the predictive model may use inputs that reflect the optimal choice for the user or the customer care system provider, or both. Further, the model can be set to provide different results at different times, such as by ruling out particular resources at times when they are being maintained. Additionally, a communications carrier may also provide decisive input to a predictive model, in addition to or alternatively to the user and/or customer care system provider.

Although optimizing channel selection for customer care has been described with reference to several exemplary embodiments, it is understood that the words that have been used are words of description and illustration, rather than words of limitation. Changes may be made within the purview of the appended claims, as presently stated and as amended, without departing from the scope and spirit of optimizing channel selection for customer care in its aspects. Although optimizing channel selection for customer care has been described with reference to particular means, materials and embodiments, optimizing channel selection for customer care is not intended to be limited to the particulars disclosed; rather optimizing channel selection for customer care extends to all functionally equivalent structures, methods, and uses such as are within the scope of the appended claims.

For example, a predictive model may use more or fewer than the types of inputs described herein. Inputs may include one or more types of information such as channel type, customer demographic information, customer account value, customer history in contacting a customer care provider, communication device type, day of week, time of day, specific resource constraints provided by the customer care provider and so on. A customer care provider may set the predictive model to only use the customer care provider's preferences at some times, such as in overnight or peak hours whereas the predictive model may at other times be set to consider other and more wide ranging information such as customer histories and expected successes based on channel type.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols.

The illustrations of the embodiments described herein are intended to provide a general understanding of the structure of the various embodiments. The illustrations are not intended to serve as a complete description of all of the elements and features of the disclosure described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

According to an aspect of the present disclosure, a communication service is provided by receiving, at a customer contact system, a customer inquiry from a customer. A ranking for the different types of resources for handling the customer inquiry is calculated using metrics for content of the customer inquiry, previous communications from the customer, availability of different types of resources for handling the customer inquiry and relative costs of each different type of resources for handling the customer inquiry. A type of resource with the highest rank is offered to the customer in order to resolve the customer inquiry.

According to another aspect of the present disclosure, the calculating is performed using a predictive model that provides variable results for different customers and different inquiries. Additionally, the predictive model is optimized to reflect results for previous customer inquiries.

According to still another aspect of the present disclosure, the method further includes identifying a relative value of the customer compared to other customers. Additionally, the calculating further uses a metric of the relative value of the customer.

According to yet another aspect of the present disclosure, the customer inquiry is received via the internet.

According to another aspect of the present disclosure, the customer inquiry is received via a telephone call.

According to still another aspect of the present disclosure, the customer contact system is automated.

According to yet another aspect of the present disclosure, the metrics include a score based on a type of the customer inquiry.

According to another aspect of the present disclosure, the metrics include a score based on a type of the customer.

According to still another aspect of the present disclosure, the score is based on spending by the customer.

According to yet another aspect of the present disclosure, the score is based on an account used by the customer.

According to another aspect of the present disclosure, the score is based on an analysis of words used by the customer in the customer inquiry.

According to still another aspect of the present disclosure, the different types of resources include different channels by which the customer can be contacted.

According to yet another aspect of the present disclosure, the different types of resources include agents with different skills that can contact the customer.

According to another aspect of the present disclosure, the ranking is in the order of estimated cost to contact the customer.

According to still another aspect of the present disclosure, the ranking is in the order of relative availability for the different types of resources.

According to yet another aspect of the present disclosure, the resource that is offered is a type of communication different from a type by which the customer inquiry is received.

According to another aspect of the present disclosure, the resource that is offered is a channel that has not been used previously by the customer according to a communication history for the customer.

According to still another aspect of the present disclosure, the method further includes automatically updating the predictive models to incorporate the results of new customer inquiries since a last update.

According to an aspect of the present disclosure, a tangible computer readable storage medium stores a computer program. When executed by a processor the computer program causes a computer apparatus to perform a process that includes receiving, at a customer contact system, a customer inquiry from a customer. The process also includes calculating, using metrics for content of the customer inquiry, previous communications from the customer, availability of different types of resources for handling the customer inquiry and relative costs of each different type of resources for handling the customer inquiry, a ranking for the different types of resources for handling the customer inquiry. The process also includes offering a type of resource with the highest rank to the customer in order to resolve the customer inquiry.

According to an aspect of the present disclosure, a computer apparatus includes a memory that stores instructions, and a processor that executes the instructions. When executed by the processor, the instructions cause the processor to perform operations including receiving, at a customer contact system, a customer inquiry from a customer. The operations also include calculating, using metrics for content of the customer inquiry, previous communications from the customer, availability of different types of resources for handling the customer inquiry and relative costs of each different type of resources for handling the customer inquiry, a ranking for the different types of resources for handling the customer inquiry. The instructions also include offering a type of resource with the highest rank to the customer in order to resolve the customer inquiry.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The preceding description of the disclosed embodiments is provided to enable any person skilled in the art to make or use the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method of providing a communication service, comprising:
    receiving, at a communication channel of a customer contact system, a customer inquiry from a customer, the customer contact system being accessible from a plurality of communication channels;
    retrieving, by a processor of the customer contact system, a profile of the customer;
    calculating, by the processor, availability of different communication channels for handling the customer inquiry;
    dynamically ranking using a predictive model, by the processor in response to the receiving, the retrieving and the calculating, the different communication channels for handling the customer inquiry based on the profile of the customer, content of previous interactions with the customer, and the availability of the different communication channels;
    offering a communication channel with highest rank for selection by the customer, among dynamically ranked communication channels, to the customer in order to resolve the customer inquiry;
    determining, after a communication via a selected communication channel is terminated, whether the selection by the customer matched the predictive model, and
    updating the predictive model based on the determining,
    wherein the predictive model provides variable results for different customers and different inquiries.

2. The method of claim 1,
    wherein the ranking further uses metrics for content of the customer inquiry, previous communications from the customer, and relative costs of each of the different communication channels for handling the customer inquiry, and
    wherein the predictive model is optimized to reflect results for previous customer inquiries.

3. The method of claim 2, further comprising:
    identifying a relative value of the customer compared to other customers,
    wherein the ranking further uses a metric of the relative value of the customer.

4. The method of claim 1,
    wherein the different communication channels for handling the customer inquiry are differently ranked according to respective availability of the different communication channels at a time of receiving the customer inquiry.

5. The method of claim 1,
    wherein the communication channel with highest rank is varied in accordance with the respective availability of the different communication channels at a time of receiving the customer inquiry.

6. The method of claim 1,
    wherein the different communication channels for handling the customer inquiry are dynamically ranked based on demographic information of the customer.

7. The method of claim 2,
    wherein the metrics include a score based on a type of the customer inquiry.

8. The method of claim 2,
    wherein the metrics include a score based on a type of the customer.

9. The method of claim 8,
    wherein the score is based on spending by the customer.

10. The method of claim 8,
    wherein the score is based on an account used by the customer, a time of day of the customer inquiry, and whether a particular type of specialized resource is available to service the customer inquiry.

11. The method of claim 8,
    wherein the score is based on an analysis of words used by the customer in the customer inquiry.

12. The method of claim 1,
    wherein the different communication channels are channels by which to contact an agent.

13. The method of claim 1,
    wherein the different communication channels include agents with different skills that can contact the customer.

14. The method of claim 1,
    wherein the ranking is in an order of estimated cost to contact the customer.

15. The method of claim 1,
    wherein the ranking is in an order of relative availability for the different communication channels.

16. The method of claim 1,
wherein the communication channel that is offered is a communication channel different from the communication channel by which the customer inquiry is received.

17. The method of claim 1,
wherein the communication channel that is offered is a communication channel that has not been used previously by the customer according to a communication history for the customer.

18. The method of claim 2, further comprising:
automatically updating the predictive model to incorporate results of new customer inquiries since a last update.

19. A non-transitory computer readable storage medium that stores a computer program, the computer program, when executed by a processor, causing a computer apparatus to perform a process comprising:
receiving, at a communication channel of a customer contact system, a customer inquiry from a customer, the customer contact system being accessible from a plurality of communication channels;
retrieving a profile of the customer;
calculating availability of different communication channels for handling the customer inquiry;
dynamically ranking using a predictive model in response to the receiving, the retrieving and the calculating, the different communication channels for handling the customer inquiry based on the profile of the customer, content of previous interactions with the customer, and the availability of the different communication channels;
offering a communication channel with highest rank for selection by the customer, among dynamically ranked communication channels, to the customer in order to resolve the customer inquiry;
determining, after a communication via a selected communication channel is terminated, whether the selection by the customer matched the predictive model, and
updating the predictive model based on the determining,
wherein the predictive model provides variable results for different customers and different inquiries.

20. A computer apparatus, comprising:
a memory that stores instructions, and
a processor that executes the instructions,
wherein, when executed by the processor, the instructions cause the processor to perform operations comprising:
receiving, at a communication channel of a customer contact system, a customer inquiry from a customer, the customer contact system being accessible from a plurality of communication channels;
calculating availability of different communication channels for handling the customer inquiry;
dynamically ranking using a predictive model, in response to the receiving, the retrieving and the calculating, the different communication channels for handling the customer inquiry based on the profile of the customer, content of previous interactions with the customer, and the availability of the different communication channels;
offering a communication channel with highest rank for selection by the customer, among dynamically ranked communication channels, to the customer in order to resolve the customer inquiry;
determining, after a communication via a selected communication channel is terminated, whether the selection by the customer matched the predictive model, and
updating the predictive model based on the determining,
wherein the predictive model provides variable results for different customers and different inquiries.

\* \* \* \* \*